(12) United States Patent
Mundada et al.

(10) Patent No.: US 7,350,089 B2
(45) Date of Patent: Mar. 25, 2008

(54) SYSTEM FOR MEMORY HOT SWAP

(75) Inventors: Gopal Mundada, Olympia, WA (US); Mark Chubb, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 364 days.

(21) Appl. No.: 11/169,209

(22) Filed: Jun. 28, 2005

(65) Prior Publication Data

US 2006/0294414 A1    Dec. 28, 2006

(51) Int. Cl.
*G06F 1/00* (2006.01)
(52) U.S. Cl. ...................... 713/300; 713/330
(58) Field of Classification Search ........... 713/300, 713/330
See application file for complete search history.

(56) References Cited

U.S. PATENT DOCUMENTS

| | | | |
|---|---|---|---|
| 6,047,343 A * | 4/2000 | Olarig | 710/302 |
| 6,535,944 B1 * | 3/2003 | Johari et al. | 710/302 |
| 6,587,909 B1 * | 7/2003 | Olarig et al. | 710/302 |
| 6,760,675 B1 * | 7/2004 | Szwec et al. | 702/78 |
| 6,775,791 B2 * | 8/2004 | McAfee | 714/6 |
| 2002/0002651 A1 * | 1/2002 | MacLaren et al. | 711/102 |
| 2002/0002690 A1 * | 1/2002 | Lai et al. | 714/6 |
| 2006/0217917 A1 * | 9/2006 | Abe | 702/119 |

\* cited by examiner

*Primary Examiner*—Chun Cao
*Assistant Examiner*—Michael Wang
(74) *Attorney, Agent, or Firm*—Buckley, Maschoff & Talwalkar LLC

(57) ABSTRACT

A system may include a motherboard, a chipset coupled to the motherboard, a memory module mount coupled to the chipset, a power transistor electrically coupled to the memory module mount, a voltage regulator to provide power to the power transistor, and an I/O expander coupled to the motherboard. The I/O expander is to receive instructions from the chipset to selectively control the power transistor to provide the power to the memory module mount.

16 Claims, 8 Drawing Sheets

SYSTEM FOR MEMORY HOT SWAP

BACKGROUND

Some conventional computing systems allow a user to install, remove, or exchange memory modules while the systems are operating. This "hot swap" capability is generally supported using one or more of dedicated controllers, voltage regulators and complex circuitry. As a result, hot swapping is typically not supported by lower-end systems. It is desired to provide a system for memory hot swap that may be more suitable for low-cost and/or small form factor computing systems than current hot swap systems.

DETAILED DESCRIPTION

Figure 1:
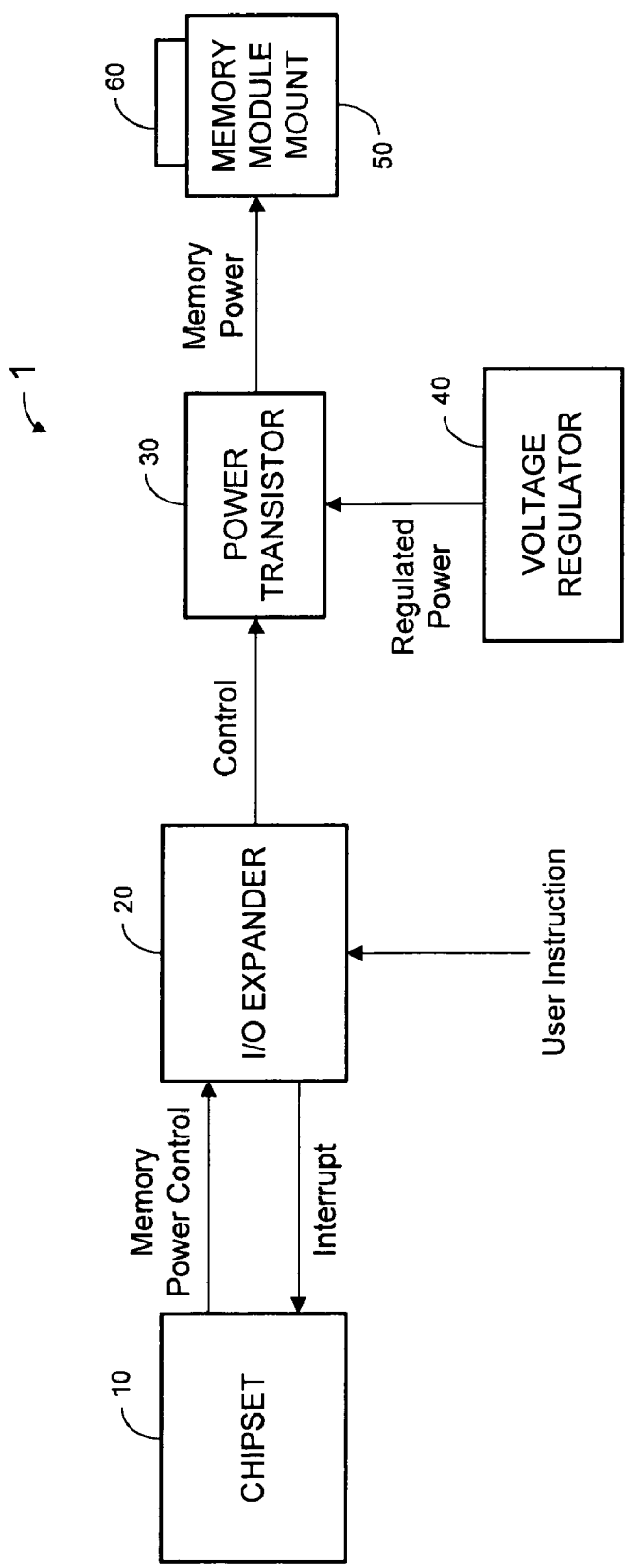
FIG. 1 is a simplified block diagram of a system according to some embodiments.

FIG. 1 is a block diagram of system 1 according to some embodiments. System 1 may comprise any suitable device or devices. In some embodiments, system 1 comprises a small form factor server motherboard. System 1 as illustrated comprises chipset 10, I/O expander 20, power transistor 30, voltage regulator 40, and memory module mount 50 coupled to memory module 60.

According to some embodiments, system 1 operates to provide power to power transistor 30, to control power transistor 30 to transmit the power to memory module mount 50, to receive an instruction from a user to remove memory module 60 from memory module mount 50, and controlling power transistor 30 to prevent transmission of the power to memory module mount 50 in response to the instruction. Details of the foregoing process according to some embodiments are provided below.

Chipset 10 may comprise any suitable chipset for providing functionality to a microprocessor (not shown). Such functionality may or may not include memory controller functions, I/O functions, graphics controller functions, or the like. Chipset 10 may communicate with such a microprocessor over a Front Side Bus. Chipset 10 may comprise one or more distinct integrated circuits. In some embodiments, chipset 10 comprises an Intel Northbridge® chip and system 1 also includes a corresponding Intel Southbridge® chip.

I/O expander 20 may comprise a device having several I/Os. I/O expander 20 may be configured to provide particular output signals based on received input signals. Chipset 10 may provide instructions to I/O expander 20 to selectively control power transistor 30 so as to provide power to memory module mount 50. As shown, I/O expander 20 may also receive user input and may transmit an interrupt to chipset 10.

Power transistor 30 may comprise a Metal Oxide Semiconductor Field Effect Transistor (MOSFET) or any other suitable power transistor that is or becomes known. Power transistor may exhibit a low drain-to-source resistance (when "turned on") according to some embodiments. Power transistor 30 receives the aforementioned power from voltage regulator 40.

Voltage regulator 40 may be implemented as a voltage regulator module that may be plugged into a motherboard, as a voltage regulator "down" that is laid out on a motherboard, or in any other fashion. Generally, voltage regulator 40 may comprise any currently- or hereafter-known device to provide power transistor 30 with a supply voltage suitable for operation of memory module mount 50.

Memory module mount 50 may comprise any currently- or hereafter-known electromechanical device for electrically and physically coupling a memory module to a motherboard. Memory module 60 may comprise any type of electronic memory compatible with memory module mount 50 and system 1. According to some embodiments, memory module comprises a Fully-Buffered Dual In-line Memory Module (FBDIMM).

In operation according to some embodiments and as illustrated in FIG. 1, I/O expander 20 may receive an instruction from a user to remove memory module 60. As a result, I/O expander 20 transmits an interrupt to chipset 10. Chipset 10 then instructs I/O expander 20 to turn off power to memory module mount 50. I/O expander 20, in turn, controls power transistor 30 to prevent the transmission of regulated power from voltage regulator 40 to memory module mount 50. Again, this process will be described below in great detail according to some embodiments.

Figure 2:
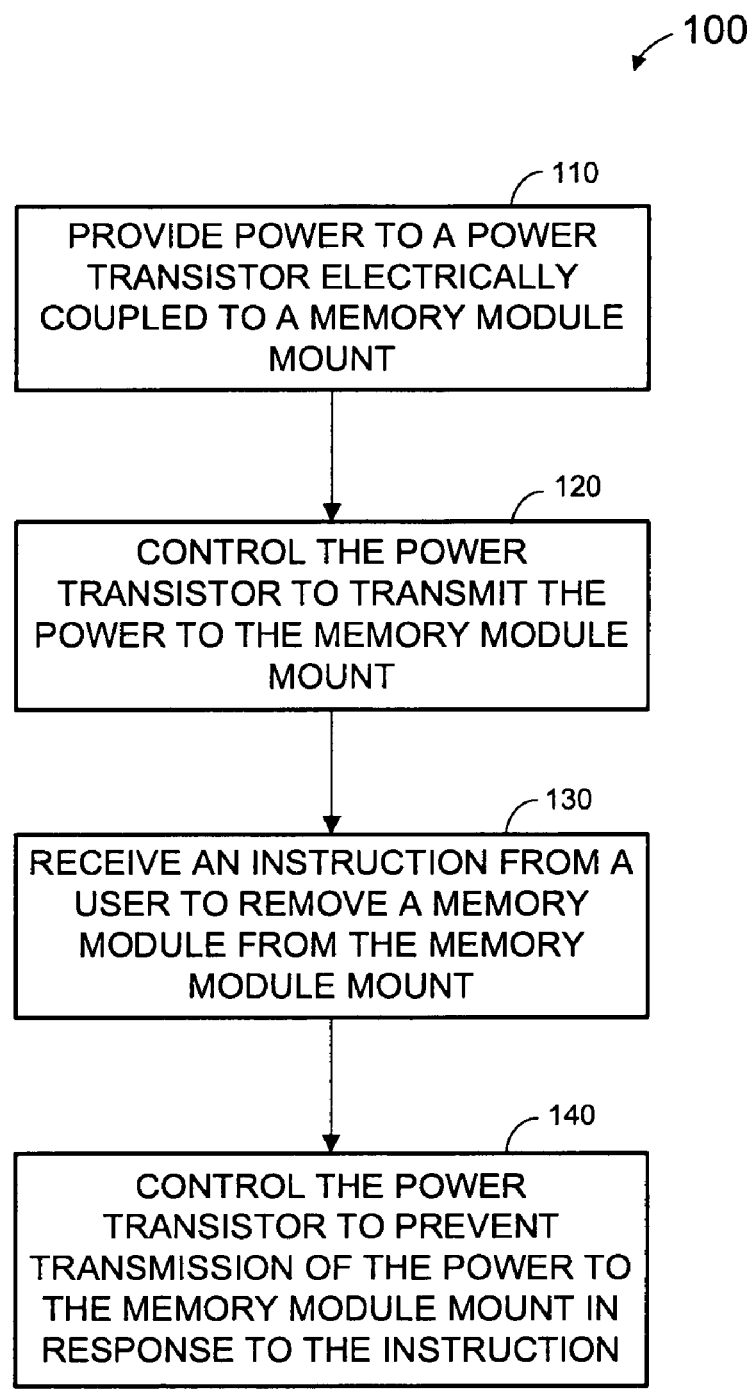
FIG. 2 is a flow diagram of a process according to some embodiments.

FIG. 2 is a flow diagram of process 100 according to some embodiments. Process 100 may be executed by elements of system 1 according to some embodiments. Process 100 may be executed by any combination of hardware and/or software.

Initially, at 110, power is provided to a power transistor electrically coupled to a memory module mount. Turning back to FIG. 1 for illustration, voltage regulator 40 may provide power to power transistor 30 at 110. Next, at 120, the power transistor is controlled to transmit the provided power to memory module mount to which it is electrically coupled.

In the FIG. 1 embodiment, I/O expander 20 may control power transistor 30 to transmit the provided power to memory module mount 50 at 120. For example, I/O expander 20 may apply a gate voltage to power transistor 30 that "turns on" transistor 30 to enable transistor to conduct the provided power to memory module mount 50. The power allows memory module 50 and memory 60 to operate within system 1.

An instruction is received from a user at 130. The instruction is an instruction to remove a memory module from the memory module mount. I/O expander 20 may receive the instruction via one of its inputs. In response to the instruction, the power transistor is then controlled at 140 to prevent transmission of the power to the memory module mount.

According to some embodiments of 140, I/O expander 20 transmits an interrupt to chipset 10 in response to the received instruction. The interrupt indicates to chipset 10 that a status of an input to I/O expander 20 has changed. According to some embodiments, chipset 10 may also or alternatively poll I/O expander 20 for such state changes over a System Monitoring (SM) bus.

After receiving notice of the state change via an interrupt and/or poll, chipset 10 issues a READ request to I/O expander 20 over the SM bus to identify the changed input. Chipset 10 thereby determines that a hot swap instruction has been issued.

Next, chipset 10 determines if power to memory module mount 50 may be safely turned off. If so, chipset 10 instructs I/O expander 20 to control power transistor 30 accordingly. I/O expander 20 therefore controls the voltage applied to the gate of transistor 30, thereby preventing transmission of power from voltage regulator 40 to memory module 50.

Figure 3:
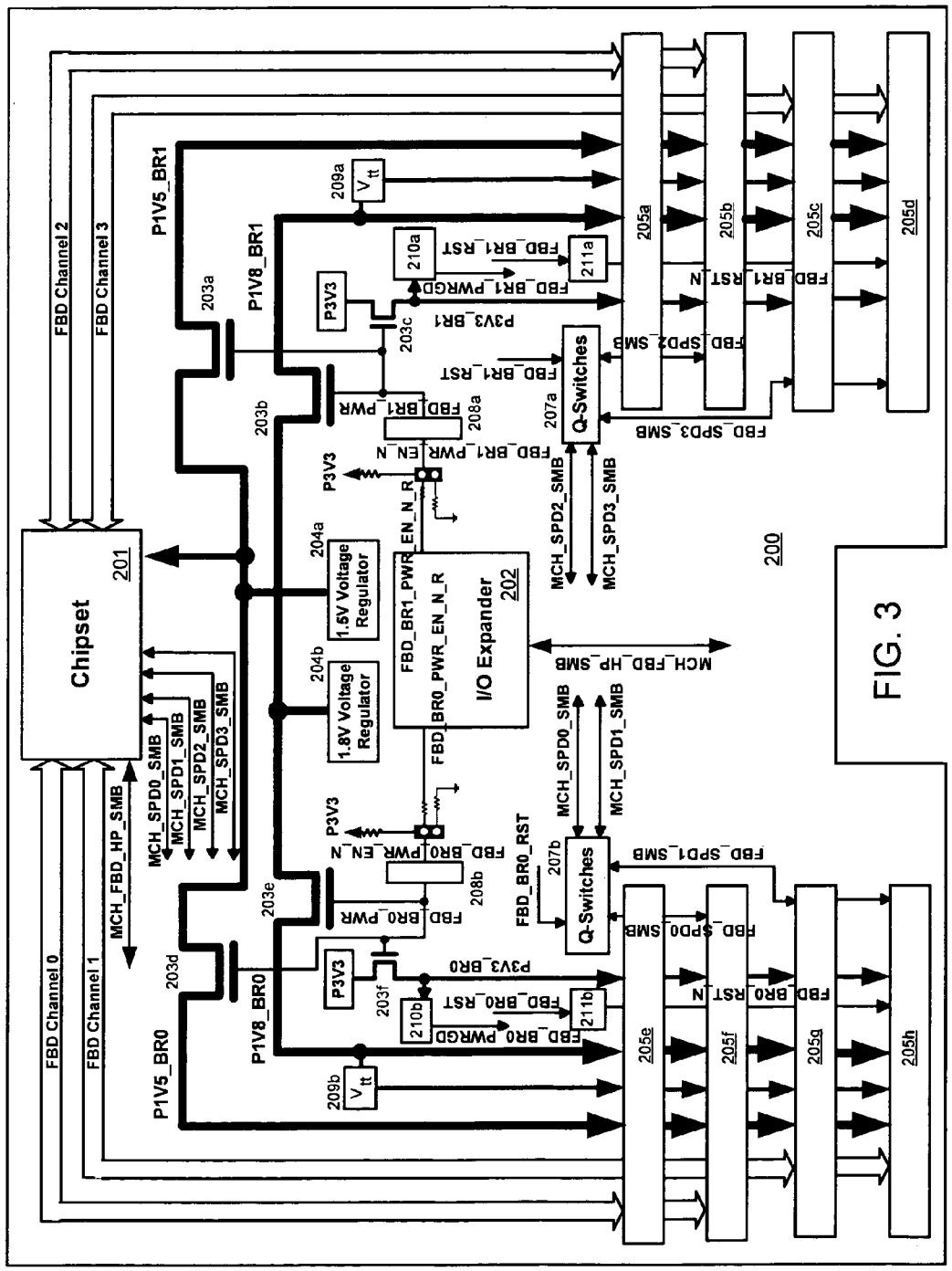
FIG. 3 is a detailed block diagram of a system according to some embodiments.

FIG. 3 is a schematic block diagram of motherboard 200 according to some embodiments. Motherboard 200 may comprise components to perform process 100. Motherboard 200 may comprise, but is not limited to, a small form factor server motherboard.

Motherboard 200 includes chipset 201, I/O expander 202, power transistors 203a through 203d, voltage regulators 204a and 204b, and memory module mounts 205a through 205h. Each of these components may function as described with respect to similarly-named components of system 1.

Generally, chipset 201 communicates over four memory channels, each of which is associated with two of memory module mounts 205a through 205h. FIG. 3 illustrates two memory branches, with each branch consisting of two memory channels and four memory module mounts. Each of voltage regulators 204a and 204b provide regulated power necessary for the operation of each of memory module mounts 205a through 205h and any memory modules coupled thereto. The regulated power is gated by respective ones of power transistors 203a through 203d, which comprise MOSFETs in this example. According to some embodiments, each memory channel may be associated with one or more dedicated power transistors for independently controlling the transmission of power to each memory channel.

I/O expander 202 communicates with chipset 201 via interrupt signals and/or over an SM bus. I/O expander 202 may thereby provide an interrupt to chipset 201, be polled by chipset 201 over the SM bus, and/or receive an instruction from chipset 201 to turn power off to one or more of memory module mounts 205a through 205h.

I/O expander 202 is coupled to the gates of each of power transistors 203a through 203d to control the transmission of regulated power to each of memory module mounts 205a through 205h. As illustrated, I/O expander 202 may control power transistors 203a and 203b to prevent transmission of power to memory module mounts 205a through 205d of memory branch BR1 via the FBD_BR1_PWR_EN_N_R signal. Similarly, I/O expander 202 may control power transistors 203c and 203d to prevent transmission of power to memory module mounts 205e through 205h of memory branch BR0 via the FBD_BR0_PWR_EN_N_R signal.

Also coupled to motherboard 200 are "Q-switches" 207a and 207b, voltage level translation circuitry 208a and 208b, $V_{TT}$ voltage regulators 209a and 209b, PWR_GD signal generation circuitry 210a and 210b, and inversion and voltage level translation logic 211a and 211b. Q-switches 207a and 207b may each comprise a switching network to determine that power is not being transmitted to a memory branch and to disconnect memory module mounts of the memory branch from the SM bus and/or from any other signals of motherboard 200.

Figure 4:
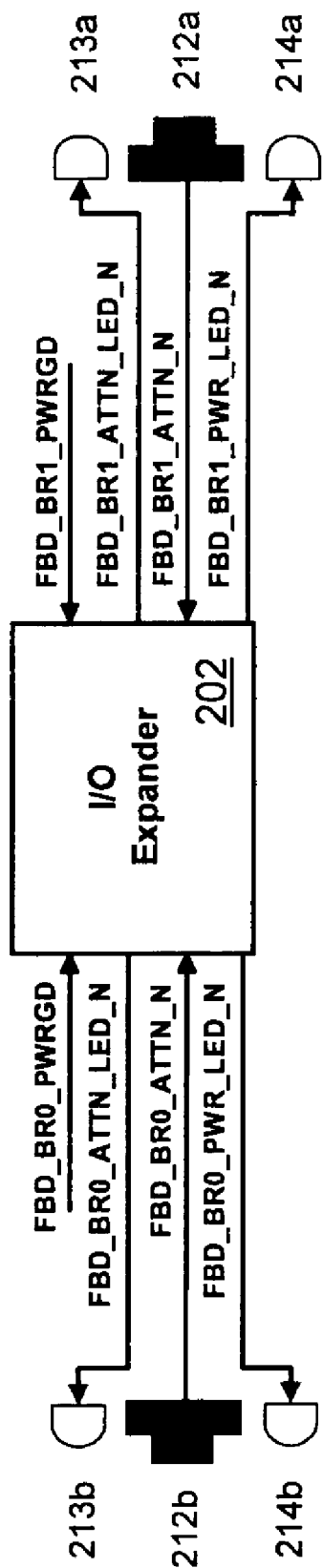
FIG. 4 is a block diagram of an I/O expander and associated signals according to some embodiments.

FIG. 4 is a schematic diagram showing input and output signals associated with I/O expander 202 according to some embodiments. These signals are not illustrated in FIG. 3 due to space constraints.

As shown, I/O expander 202 may receive signal FBD_BR1_ATTN_N from switch 212a. The signal may comprise a user instruction to remove a memory module from memory branch BR1. I/O expander 202 may transmit signals FBD_BR1_ATTN_LED_N and FBD_BR1_PWR_LED_N to Light-Emitting Diodes (LEDs) 213a and 214a, respectively. According to some embodiments, signal FBD_BR1_ATTN_LED_N controls LED 213a if a memory module of branch BR1 should be replaced, and signal FBD_BR1_PWR_LED_N controls LED 214a if suitable power is supplied to branch BR1. Signal FBD_BR1_PWRGD may indicate to I/O expander 202 that branch BR1 is receiving suitable power.

I/O expander 202 also communicates with switch 212b, LED 213b, and LED 214b. These elements transmit or receive signals similar to those described above but with respect to memory branch BR0. In addition, signal FBD_BR0_PWRGD may indicate that branch BR0 is receiving suitable power.

Figure 5A:
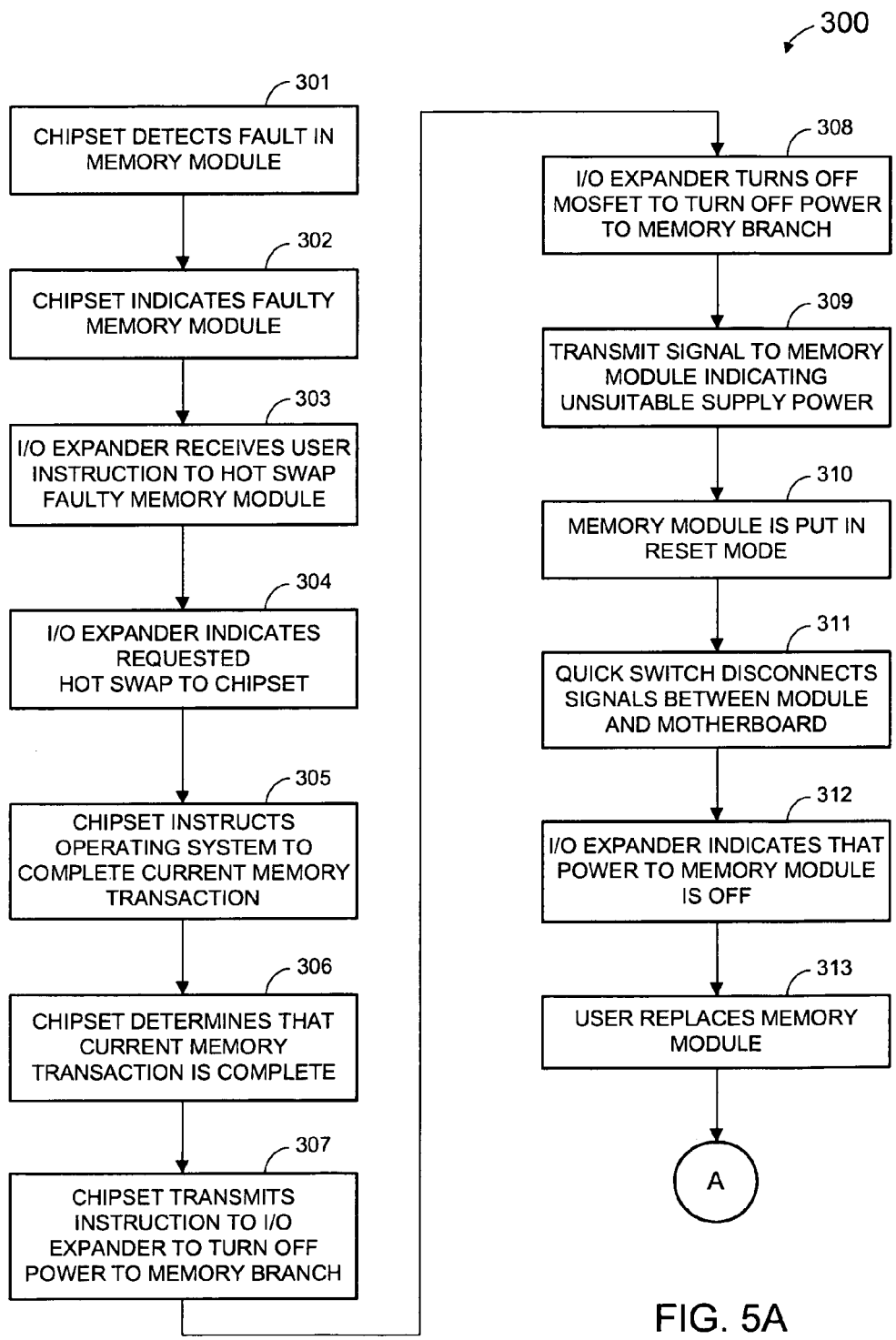
FIGS. 5A and 5B comprise a flow diagram of a process according to some embodiments.
Figure 5B:
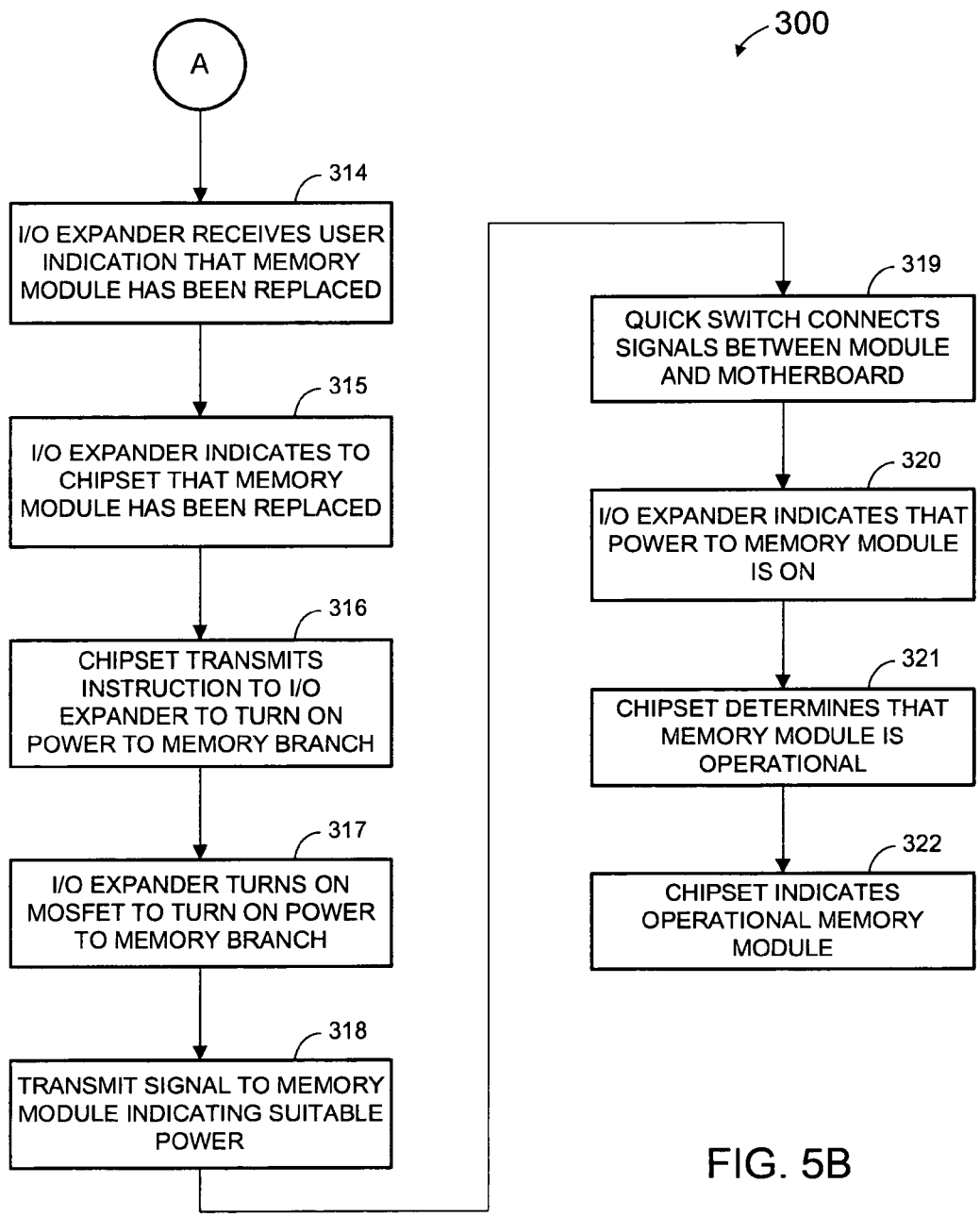

FIG. 5 is a block diagram of process 300 according to some embodiments. Process 300 may provide hot swap functionality. Process 300 will be described below in conjunction with elements of FIGS. 3 and 4, but any other suitable system or systems may execute process 300.

Figure 6:
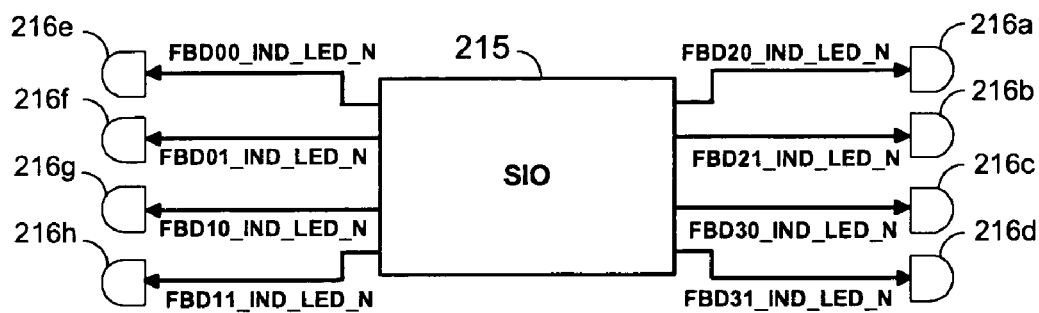
FIG. 6 is a diagram of a circuit to control memory status indicators according to some embodiments.

A chipset initially detects a fault in a memory module at 301. The chipset may receive an operating system message indicating the fault. The chipset may then indicate the faulty memory module to a user at 302. FIG. 6 illustrates a system to indicate a faulty memory module according to some embodiments. FIG. 6 illustrates Super I/O chip 215, which may provide motherboard 200 with support for legacy I/O systems (e.g., serial, PS/2, parallel, etc.). Super I/O chip 215 may comprise any suitable general-purpose I/O component. Chip 215 may receive an instruction from chipset 201 at 302 to control one of LEDs 216a through 216h to turn on. The on LED may correspond to the one of memory module mounts 205a through 205h that is coupled to the faulty memory module. Upon viewing an illuminated LED, the user is therefore able to determine a location of the faulty memory module.

Next, at 303, an I/O expander receives a user instruction to hot swap the faulty memory module. This instruction may be received by I/O expander 202 in response to user manipulation of one of switches 212a and 212b. More specifically, the user may determine, based on an illuminated one of LEDs 216a through 216h, that branch BR1 includes a faulty memory module. The user therefore depresses switch 212a, causing a state transition in the FBD_BR1_ATTN_N signal that is input to I/O expander 202. The FBD_BR1_ATTN_N signal thereby comprises an instruction to hot swap a memory module of branch BR1.

In response to the FBD_BR1_ATTN_N state transition, the I/O expander indicates the requested hot swap to the chipset at 304. The indication may initially consist of an interrupt notifying chipset 201 that a status of an input to I/O expander 202 has changed. As mentioned above, chipset 201 may also or alternatively poll I/O expander 202 over the SM bus at 304 to detect input state transitions. In response to the state change, chipset 201 issues a READ request to I/O expander 202 over the SM bus to determine that a hot swap has been requested.

The chipset instructs an operating system to complete any current memory transactions at 305. In the illustrated embodiment, chipset 201 may communicate at 305 with an operating system executed by a microprocessor of motherboard 200. The operating system may transmit a message to chipset 201 after the transaction is complete. Accordingly, the chipset determines that the transaction is complete at 306.

At 307, the chipset transmits an instruction to the I/O expander to turn off power to the memory branch associated with the faulty module. According to the present example, the instruction is transmitted from chipset 201 to I/O expander 202 over the SM bus (MCH_FBD_HP_SMB).

Accordingly, the I/O expander turns off a MOSFET to turn off power to the specified memory branch. The MOSFET may be turned off by controlling the gate voltage thereof so as to prevent current from flowing between the drain and source. Returning to FIG. 3, I/O expander 202 controls the FBD_BR1_PWR_EN_N_R signal to turn off power to MOSFETs 203a through 203c. As a result, operational power is not delivered to memory modules 205a through 205d via the P1V5_BR1, P1V8_BR1, and P3V3_BR1 signals. Such control does not affect power provided to memory module mounts 205e through 205h of memory branch BR0.

Next, at 309, a signal is transmitted to the subject memory module indicating that a suitable supply power is unavailable. According to the presently-described embodiment of process 300, PWR_GD signal generation circuitry 210a generates a low FBD_BR1_PWRGD signal due to the lowered voltage level of the P3V3_BR1 signal.

Figure 7:
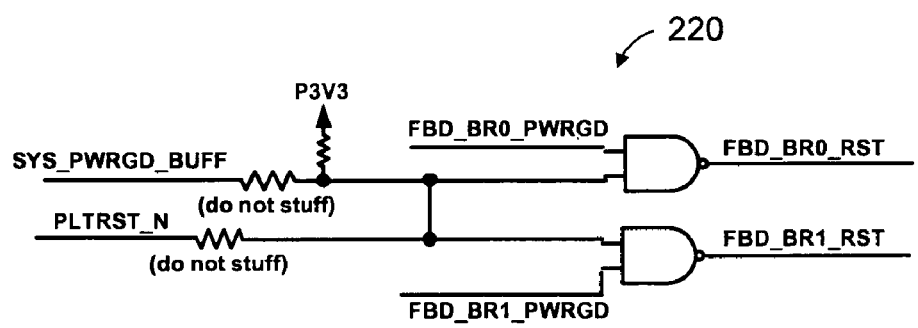
FIG. 7 is a schematic diagram of a circuit to provide a memory reset signal according to some embodiments.

FIG. 7 illustrates logic network 220 for receiving the low FBD_BR1_PWRGD signal. As shown, the FBD_BR1_RST signal is low if the FBD_BR1_PWRGD signal and the other system power indicators (SYS_PWRGD_BUFF or PLTRST_N) are high. The FBD_BR1_RST signal goes high at 309 due to the low FBD_BR1_PWRGD signal.

Returning to FIG. 3, the FBD_BR1_RST signal is received by voltage level translation logic 211a, which outputs an FBD_BR1_RST_N signal based thereon. The FBD_BR1_RST_N signal is received by memory module mounts 205a through 205d and indicates the unsuitable supply power level. Accordingly, any memory module coupled thereto is put in a reset mode at 310. Again, memory branch BR0 is unaffected because the FBD_BR0_RST signal is unaffected by the change in the FBD_BR1_PWRGD signal.

The FBD_BR1_RST signal is also received by Q-switches 207a at 309. Based on the change in this signal, Q-switches 207a determine that suitable power is not being transmitted to memory branch BR1. Q-switches 207a then disconnect memory module mounts 205a through 205b from the SM bus and/or from any other signals of motherboard 200 at 311.

The I/O expander indicates that power to the memory module is off at 312. As shown in FIG. 4, I/O expander 202 controls LED 214a to indicate whether power to branch BR1 is on or off.

After verifying that power to branch BR1 is off, the user may replace the faulty memory module at 313. The user may depress switch 212a after completing the replacement. As a result, I/O expander 202 receives a state transition of the FBD_BR1_ATTN_N signal at 314.

In response to the state transition, the I/O expander indicates to the chipset at 315 that the memory module has been replaced. Such an indication may comprise an interrupt triggered by the state transition, and a subsequent response to a READ query received by I/O expander 202 from chipset 201 over the SM bus. In some embodiments, the READ query is issued based on a poll of I/O expander 202 as described above.

Next, at 316, the chipset transmits an instruction to the I/O expander to turn on power to the associated memory branch. Again, the instruction may be transmitted from chipset 201 to I/O expander 202 over the SM bus.

The I/O expander then turns on a MOSFET to turn on power to the specified memory branch. In some embodiments of 317, I/O expander 202 controls the FBD_BR1_PWR_EN_N_R signal to turn on power to MOSFETs 203a through 203c. As a result, operational power is delivered to memory modules 205a through 205d via the P1V5_BR1, P1V8_BR1, and P3V3_BR1 signals. As mentioned above, control of the FBD_BR1_PWR_EN_N_R signal does not affect power provided to memory module mounts 205e through 205h of memory branch BR0.

A signal is then transmitted to the replaced memory module at 318. The signal indicates that a suitable supply power is available. In contrast to the description of 309 above, PWR_GD signal generation circuitry 210a then generates a high FBD_BR1_PWRGD signal at 318 due to the raised voltage level of the P3V3_BR1 signal. The FBD_BR1_RST signal output by logic network 220 goes high in response to the high FBD_BR1_PWRGD signal. The FBD_BR1_RST signal is received by voltage level translation logic 211a, which outputs an FBD_BR1_RST_N signal to memory module mounts 205a through 205d that indicates that the system has come out of reset after a suitable supply power level.

The FBD_BR1_RST signal is received by Q-switches 207a at 319. In response, Q-switches 207a connect memory module mounts 205a through 205b to the SM bus and/or to any other suitable signals of motherboard 200.

The I/O expander indicates that power to the memory module is on at 320. Such an indication may be based on the FBD_BR1_PWRGD signal received by I/O expander 202.

In response to the indication, the chipset determines that the replaced memory module is operational at 321. The determination may be based on a message received from the operating system. In some embodiments of 321, chipset 201 determines that a sufficient time has elapsed since the FBD_BR1_RST_N signal was transmitted to the memory module at 318.

The chipset then indicates that the memory module is operational at 322. The indication may comprise instructing I/O expander 202 to control LED 214a to indicate that power to branch BR1 is on.

In some embodiments, a user initiates process 300 at 303 without receiving an indication of a memory fault. Such a situation may occur in a case that the user desires to upgrade an existing and functioning memory module with a different memory module.

Figure 8:
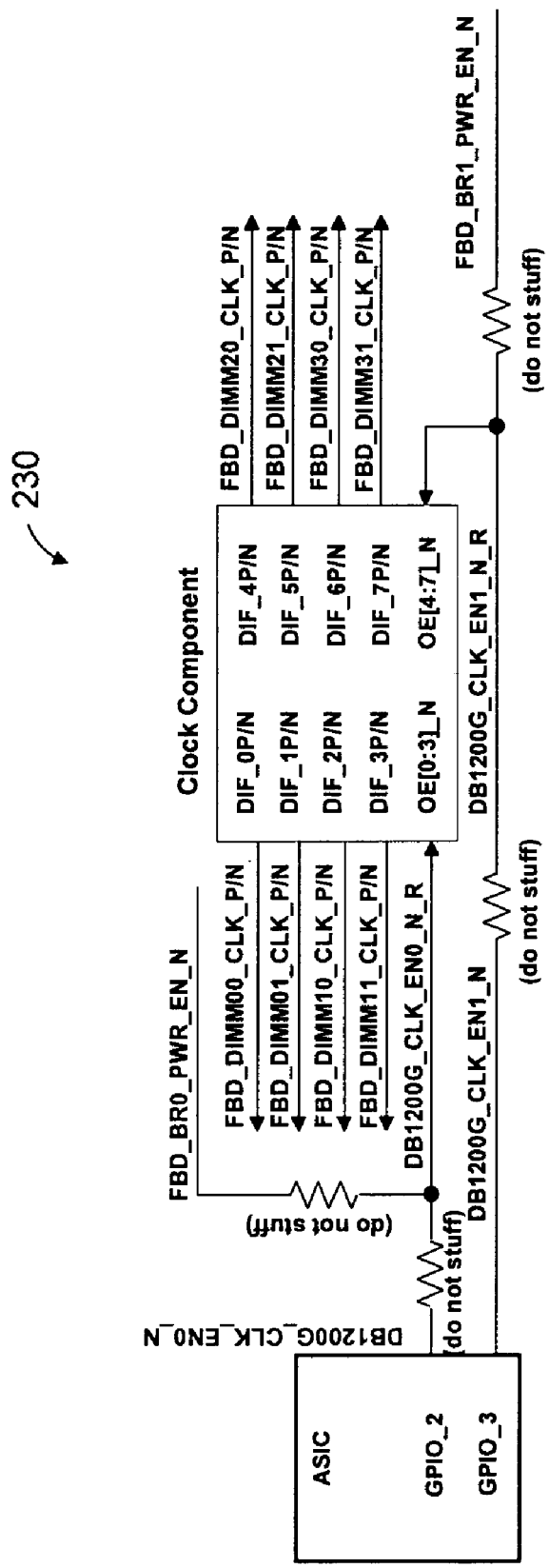
FIG. 8 is a schematic diagram of a clock circuit according to some embodiments.

FIG. 8 is a schematic diagram of a clocking circuit to further enable the FIG. 3 system according to some embodiments. Clocking circuit 230 receives the aforementioned FBD_BR1_PWR_EN_N signal and the corresponding FBD_BR0_PWR_EN_N signal and outputs suitable clock signals to memory module mounts 205a through 205d based thereon. Clocking circuit 230 as illustrated includes specific component integrated circuits, but some embodiments may use additional and/or alternative integrated circuits.

The several embodiments described herein are solely for the purpose of illustration. Some embodiments may include any currently or hereafter-known versions of the elements described herein. Therefore, persons skilled in the art will recognize from this description that other embodiments may be practiced with various modifications and alterations.

What is claimed is:

1. A system comprising:
   a motherboard;
   a chipset coupled to the motherboard;
   a memory module mount coupled to the chipset;

a power transistor electrically coupled to the memory module mount;
a voltage regulator to provide power to the power transistor;
an I/O expander coupled to the motherboard, the I/O expander to receive instructions from the chipset to selectively control the power transistor to provide the power to the memory module mount; and
a user input device to receive physical input from a user and to transmit an instruction to the I/O expander to remove a memory module from the memory module mount,
wherein the I/O expander controls the power transistor to prevent transmission of the power to the memory module mount in response to the instruction.

2. A system according to claim 1, wherein the chipset instructs the I/O expander to control the power transistor to prevent transmission of the power to the memory module mount.

3. A system according to claim 1, further comprising:
an indicator to indicate to the user that the power is not being transmitted to the memory module mount,
wherein the I/O expander determines that the power is not being transmitted to the memory module mount and controls the indicator based on the determination.

4. A system according to claim 1, further comprising:
a switching network to determine that the power is not transmitted to the memory module mount and to disconnect the memory module mount from a system monitoring bus in response to the determination.

5. A system according to claim 4, further comprising:
a logic network to receive a power status signal from the motherboard and a power good signal indicating whether the power is being transmitted to the memory module mount, to generate a reset signal based on the power status signal and on the power good signal, and to transmit the reset signal to the switching network,
wherein the switching network determines that the power is not transmitted to the memory module mount based on the reset signal.

6. A system according to claim 1, further comprising:
a logic network to receive a power status signal from the motherboard and a power good signal indicating whether the power is being transmitted to the memory module mount, to generate a reset signal based on the power status signal and on the power good signal, and to transmit the reset signal to memory module mount.

7. A system according to claim 1, further comprising:
an indicator to indicate to a user a fault in a memory module mounted in the memory module mount.

8. A system according to claim 1, further comprising:
a second power transistor electrically coupled to the memory module mount; and
a second voltage regulator to provide second power to the second power transistor,
wherein the I/O expander receives instructions from the chipset to selectively control the second power transistor to provide the second power to the memory module mount.

9. A system according to claim 8, further comprising:
a user input device to receive physical input from a user and to transmit an instruction to the I/O expander to remove a memory module from the memory module mount,
wherein the I/O expander controls the power transistor to prevent transmission of the power to the memory module mount and the second power transistor to prevent transmission of the second power to the memory module mount in response to the instruction.

10. A system according to claim 9, wherein the chipset instructs the I/O expander to control the power transistor to prevent transmission of the power to the memory module mount and the second power transistor to prevent transmission of the second power to the memory module mount.

11. A system according to claim 9, further comprising:
a switching network to determine that the power and the second power are not transmitted to the memory module mount and to disconnect the memory module mount from a system monitoring bus in response to the determination.

12. A system comprising:
a motherboard;
a chipset coupled to the motherboard;
a fully-buffered dual in-line memory module mount coupled to the chipset;
a power transistor electrically coupled to the memory module mount;
a voltage regulator to provide power to the power transistor;
an I/O expander coupled to the motherboard, the I/O expander to receive instructions from the chipset to selectively control the power transistor to provide the power to the memory module mount; and
a user input device to receive physical input from a user and to transmit an instruction to the I/O expander to remove a memory module from the memory module mount,
wherein the I/O expander controls the power transistor to prevent transmission of the power to the memory module mount in response to the instruction.

13. A system according to claim 12, further comprising:
an indicator to indicate to the user that the power is not being transmitted to the memory module mount,
wherein the I/O expander determines that the power is not being transmitted to the memory module mount and controls the indicator based on the determination.

14. A system according to claim 12, further comprising:
a switching network to determine that the power is not transmitted to the memory module mount and to disconnect the memory module mount from a system monitoring bus in response to the determination.

15. A system according to claim 12, further comprising:
a second power transistor electrically coupled to the memory module mount; and
a second voltage regulator to provide second power to the second power transistor,
wherein the I/O expander receives instructions from the chipset to selectively control the second power transistor to provide the second power to the memory module mount.

16. A system according to claim 15, further comprising:
a user input device to receive physical input from a user and to transmit an instruction to the I/O expander to remove a memory module from the memory module mount, and wherein the chipset instructs the I/O expander to control the power transistor to prevent transmission of the power to the memory module mount and the second power transistor to prevent transmission of the second power to the memory module mount in response to the instruction.

* * * * *